United States Patent
Siomina et al.

(10) Patent No.: US 9,749,120 B2
(45) Date of Patent: Aug. 29, 2017

(54) UPLINK/DOWNLINK SWITCHING IN HALF-DUPLEX FREQUENCY DIVISION DUPLEX COMMUNICATION

(71) Applicant: TELEFONAKTIEBOLAGET L M ERICSSON (PUBL), Stockholm (SE)

(72) Inventors: Iana Siomina, Täby (SE); Muhammad Kazmi, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 395 days.

(21) Appl. No.: 14/602,740

(22) Filed: Jan. 22, 2015

(65) Prior Publication Data
US 2015/0215107 A1 Jul. 30, 2015

Related U.S. Application Data

(60) Provisional application No. 61/933,354, filed on Jan. 30, 2014.

(51) Int. Cl.
*H04L 5/16* (2006.01)
*H04W 24/08* (2009.01)
(Continued)

(52) U.S. Cl.
CPC ............ *H04L 5/16* (2013.01); *H04J 11/0056* (2013.01); *H04L 5/0048* (2013.01); *H04W 24/08* (2013.01);
(Continued)

(58) Field of Classification Search
CPC ...... H04L 5/16; H04L 5/0048; H04J 11/0056; H04J 2011/0096; H04W 24/08; H04W 24/10; H04W 52/0216; H04W 64/00
See application file for complete search history.

(56) References Cited

U.S. PATENT DOCUMENTS

2010/0080139 A1* 4/2010 Palanki ............... H04B 7/2606
370/252
2011/0013613 A1* 1/2011 Sung .................... H04L 1/1887
370/338
(Continued)

FOREIGN PATENT DOCUMENTS

KR WO 2012128505 A2 * 9/2012 ............ H04W 28/06
SE WO 2015114524 A1 * 8/2015 ............... H04L 5/16
(Continued)

OTHER PUBLICATIONS

R1-125163, was presented at 3GPP TSG-RAN WG1 Meeting #71, New Orleans, USA, Nov. 12-16, 2012 as Agenda Item: 6.3.3; titled, "Further considerations on reduction of maximum bandwidth for low cost MTC".*

(Continued)

*Primary Examiner* — Andrew Lai
*Assistant Examiner* — Hoyet H Andrews, III

(57) ABSTRACT

A method controls uplink/downlink (UL/DL) switching for half-duplex operation of user equipment (UE) in which UL and DL transmissions occur on different frequencies. The method comprises determining a duration of time required for the UE to switch between UL operation and DL operation, determining a time interval required by the UE to perform a measurement operation, determining a minimum number of subframes required for the measurement operation in the time interval, and controlling a switching configuration of the UE based on the determined duration of time, the determined time interval, and the minimum number of subframes.

35 Claims, 11 Drawing Sheets

(51) Int. Cl.
*H04J 11/00* (2006.01)
*H04W 52/02* (2009.01)
*H04L 5/00* (2006.01)
*H04W 24/10* (2009.01)
*H04W 64/00* (2009.01)

(52) U.S. Cl.
CPC ....... *H04W 24/10* (2013.01); *H04W 52/0216* (2013.01); *H04J 2011/0096* (2013.01); *H04W 64/00* (2013.01); *Y02B 60/50* (2013.01)

(56) References Cited

U.S. PATENT DOCUMENTS

| | | | | |
|---|---|---|---|---|
| 2011/0059745 | A1* | 3/2011 | Yi | H04W 24/08 455/452.2 |
| 2011/0317670 | A1* | 12/2011 | Zhang | H04L 1/1822 370/336 |
| 2012/0094664 | A1* | 4/2012 | Jung | H04W 48/16 455/434 |
| 2012/0147772 | A1* | 6/2012 | Kazmi | H04L 5/0078 370/252 |
| 2012/0147794 | A1* | 6/2012 | Chung | H04W 72/0406 370/280 |
| 2012/0170507 | A1* | 7/2012 | Sawai | H04B 7/0413 370/315 |
| 2012/0230272 | A1* | 9/2012 | Kim | H04L 1/1861 370/329 |
| 2012/0264449 | A1 | 10/2012 | Kazmi | |
| 2013/0250772 | A1* | 9/2013 | Yin | H04L 5/16 370/241 |

FOREIGN PATENT DOCUMENTS

| | | |
|---|---|---|
| WO | 2011/102769 A1 | 8/2011 |
| WO | 2012/044246 A1 | 4/2012 |
| WO | 2012/112104 A1 | 8/2012 |

OTHER PUBLICATIONS

R1-113674, was presented at 3GPP TSG-RAN WG1 #67, San Francisco, Nov. 14-18, 2011 as Agenda Item: 7.2.1.5; titled, "On support of different TDD UL-DL configurations on different bands".*

R1-120457, was presented at 3GPP TSG RAN WG1 Meeting #68, Dresden, Germany, Feb. 6-10 as Agenda Item: 7.7.6; titled, "Comments on evaluation methodology of low cost MTC UE".*

R1-120055, was presented at 3GPP TSG RAN WG1 meeting #68, Dresden, Germany, Feb. 6-10, 2012 as Agenda Item: 7.7.5; titled, "Consideration on HD-FDD for low-cost MTC UE".*

3GPP TR 36.888 V2.0.0 (Jun. 2012) titled "3rd Generation Partnership Project; Technical Specification Group Radio Access Network; Study on provision of low-cost MTC UEs based on LTE; (Release 11)" (36.888 hereinafter) was released as Technical Report published Jun. 2012.*

3GPP TS 36.213 V11.1.0 (Dec. 2012) titled "3rd Generation Partnership Project; Technical Specification Group Radio Access Network; Evolved Universal Terrestrial Radio Access (E-UTRA); Physical layer procedures; (Release 11)" (36.213 hereinafter) was released as Technical Report published Dec. 2012.*

R1-130219, was presented at 3GPP TSG-RAN WG1 Meeting #72, St Julian's, Malta, Jan. 28-Feb. 1, 2013 as Agenda Item: 7.3.4; titled, "Coverage Results and Analysis of PSS/SSS for MTC UEs".*

R1-130549, was presented at 3GPP TSG-RAN WG1 Meeting #72, St Julian's, Malta, Jan. 28-Feb. 1, 2013 as Agenda Item: 7.3.1.3; titled, "Design for Synchronized and Unsynchronized New Carriers".*

Ericsson: "Impact of Low Cost MTC on RRM requirements;" 3GPP Draft; R4-140747; 3rd Generation Partnership Project; Prague, Czech Republic; Feb. 3, 2014.

Ericsson: "Impact of Low Cost MTC on RRM requirements," 3GPP draft; R4-140747, vol. RAN WG4, No. Prague, Czech Republic; Feb. 3, 2014.

* cited by examiner

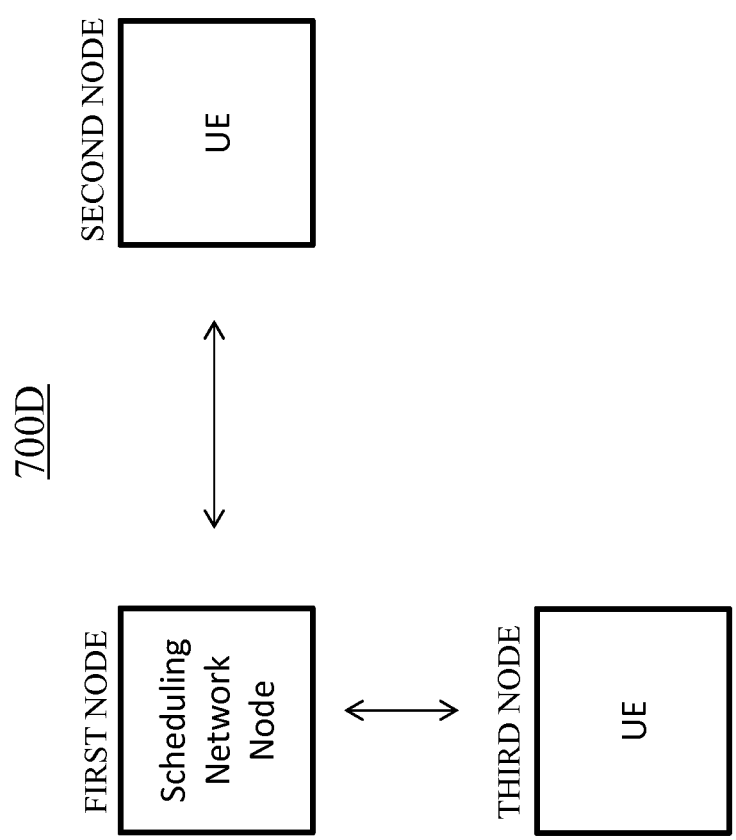

UPLINK/DOWNLINK SWITCHING IN HALF-DUPLEX FREQUENCY DIVISION DUPLEX COMMUNICATION

CROSS-REFERENCE TO RELATED APPLICATION

This application claims the benefit of U.S. Provisional Patent Application No. 61/933,354 filed on Jan. 30, 2014, the subject matter of which is hereby incorporated by reference.

TECHNICAL FIELD

The disclosed subject matter relates generally to telecommunications, and more particularly to uplink/downlink (UL/DL) switching in half-duplex (HD) frequency division duplex (FDD) communications.

BACKGROUND

A duplex communication system is one that supports point-to-point communication between two parties in both directions. In a full-duplex (FD) communication system, the communication may occur in both directions at the same time, and in a half-duplex (HD) communication system, the communication may occur in only one direction at a time.

FD and HD operations are typically implemented using either time-division duplexing (TDD) or frequency division duplexing (FDD). In TDD, outward and return signals are communicated on the same carrier frequency, but at different times (e.g., in different time slots or non-overlapping subframes). In FDD, outward and return signals are communicated on different carrier frequencies, and can be communicated at the same or different times. In full-duplex FDD (FD-FDD) outward and return signals are communicated at the same time, and in half-duplex FDD (HD-FDD), outward and return signals are communicated at different times.

The Long-Term Evolution (LTE) standard provides for both TDD and FDD modes of communication, with the FDD mode being either an FD-FDD mode or an HD-FDD mode. The HD-FDD mode has the potential benefit, under certain frequency arrangements, of being implemented without a duplex filter. For instance, a device implementing HD-FDD may use a switch to change between different frequency channels rather than using a duplex filter to maintain concurrent communication on two different frequency channels. The omission of a duplex filter may allow such a device to be implemented at relatively lower cost and with lower power consumption compared to devices that require a duplex filter. Accordingly, the use of HD-FDD may be particularly attractive for certain low-cost applications.

Some envisioned uses of the HD-FDD mode include various forms of machine type communication (MTC). MTC communication generally involves communication between machines and other machines (e.g., machine-to-machine communication) and/or between machines and humans. Such communication may include, for example, the exchange of measurement data, control signals, and configuration information. The machines involved in MTC may be of various forms and sizes, ranging from wallet-sized devices to base stations, for example. An example low-cost application of MTC is telemetry, e.g., remote temperature sensing, meter reading, and so on. In many such applications, MTC devices are deployed in large numbers, with each device operating in infrequent bursts. Accordingly, it may be beneficial to reduce the cost and/or power consumption of each device by omitting a duplex circuit and relying on HD-FDD communication.

In certain contexts, such as LTE based systems, HD-FDD communication may occur between one or more devices that support HD-FDD but not FD-FDD communication (hereafter, an "HD-FDD device"), and one or more other devices that support both HD-FDD and FD-FDD communication (hereafter, an "FD-FDD device"). In such contexts, a scheduler in an FD-FDD device (e.g., an eNodeB) may be required to consider data and control traffic in both directions when making scheduling decisions for an HD-FDD device (e.g., a low-cost MTC device). This requirement tends to add complexity to the scheduler. For example, when not in discontinuous receive (DRX) mode, the HD-FDD device may continuously receive information through downlink physical channels except when instructed by the network to transmit in the uplink or when transmitting through the physical random access channel (PRACH) on an unscheduled basis (e.g., contention-based). A switching time will need to be observed by HD-FDD devices when transitioning from receive to transmit and vice versa, and this switching time will need to be taken into account by the scheduler.

HD-FDD operation is generally implemented as a scheduler constraint, implying that the scheduler ensures that an HD-FDD device is not scheduled simultaneously in the downlink (DL) and uplink (UL). There are occasions where DL and UL transmissions cannot be avoided by scheduler constraints, such as where an HD-FDD device transmits through the PRACH on an unscheduled basis (contention-based) that cannot be predicted by an eNodeB (eNB). For example, it is possible that the HD-FDD device may transmit through the PRACH in the UL at the same time that it is scheduled to transmit through the physical downlink control channel (PDCCH) or physical downlink shared channel (PDSCH) in the DL. Under these circumstances the HD-FDD device will not be able to receive through the PDCCH/PDSCH.

The following issues have been further observed with respect to switching times of HD-FDD devices. First, a switching time for a DL-to-UL transition may be created by allowing the HD-FDD device to DRX the last orthogonal frequency division multiplexing (OFDM) symbols in a downlink subframe immediately preceding an uplink subframe. Second, a switching time for a UL-to-DL transition may be created by setting an appropriate amount of timing advance in the HD-FDD device. This switching time may be particularly beneficial where the HD-FDD is close to a cell center (with near zero timing advance). The same adjustment of the uplink timing from an eNB perspective is also applied to FD-FDD user equipment (UE).

Radio measurements done by UE (either HD-FDD or FD-FDD devices) are typically performed on both serving cells and neighbor cells over some known reference symbols or pilot sequences. Such measurements can be done on cells on an intra-frequency carrier, inter-frequency carrier(s) as well as on inter-radio-access-technology (inter-RAT) carriers(s) (depending upon the UE capability, whether it supports that RAT). To enable inter-frequency and inter-RAT measurements for a UE requiring measurement gaps, the network must configure the measurement gaps. Two periodic measurement gap patterns both with a measurement gap length of 6 ms are defined for LTE. Some measurements may also require the UE to measure signals transmitted by the UE in the UL.

Measurements can be performed for various purposes. Some example purposes include mobility, positioning, self-organizing network (SON), minimization of drive tests (MDT), operation and maintenance (O&M), and network planning and optimization. These and other types of measurements are typically performed over longer time durations on the order of few 100 ms up to several seconds.

The same measurements are generally applicable in single carrier and carrier aggregation (CA), although in CA, measurement requirements may be different. For example, a measurement period may be different in CA—it may be either relaxed or more stringent depending upon whether a secondary component carrier (SCC) is activated. This may also depend on the UE capability, i.e. whether a CA capable UE is able to perform measurement on SCC with or without gaps.

UE mobility measurements in LTE may include, for example, physical cell identity (PCI) acquisition measurements, reference symbol received power (RSRP) measurements, reference symbol received quality (RSRQ) measurements, and cell global identity (CGI) acquisition measurements, among others. Mobility measurements may also include measurements for identifying or detecting cells belonging to various different types of systems, such as LTE, high speed packet access (HSPA), CDMA2000, global system for mobile communications (GSM). The cell detection typically comprises at least PCI acquisition and subsequent signal measurement(s) (e.g. RSRP) of a target cell. The UE may also have to acquire the CGI of a UE. More specifically the US may read system information (SI) to acquire the CGI of the target cell. The UE may also acquire other information from the target cell, such as a closed subscriber group (CSG) indicator, or CSG proximity indicator.

UE positioning measurements in LTE may include, for example, reference signal time difference (RSTD) measurements and UE receive-transmit (RX-TX) time difference measurements. UE RX-TX time difference measurements require the UE to perform measurement on DL reference signals as well as on UL transmitted signals.

UE measurements for radio link maintenance, MDT, SON, and other purposes may include, for example, control channel failure rate or quality estimates (e.g., paging channel failure rate measurements, broadcast channel failure rate measurements), and physical layer problem detection (e.g. out of synchronization [out of sync] detection, in synchronization [in-sync] detection, radio link monitoring, and radio link failure determination or monitoring).

UE measurements of channel state information (CSI) may be used for scheduling and link adaptation by a network, for example. Examples of such CSI measurements include, for example, channel quality indicator (CQI) measurements, precoding matrix index (PMI) measurements, and rank indicator (RI) measurements. These measurements may be performed with respect to reference signals such as a cell-specific reference signal (CRS), a CSI reference signal (CSI-RS), or a demodulation reference signal (DMRS).

Radio measurements performed by the UE can be used by the UE for one or more radio operational tasks. Examples of such tasks include reporting measurements to the network, which in turn may use them for various tasks. For example, in a radio resource control (RRC) connected state, the UE reports radio measurements to a serving network node. In response to the reported UE measurements, the serving network node takes certain decisions e.g. it may send a mobility command to the UE for a cell change, such as a handover, RRC connection re-establishment, RRC connection release with redirection, primary cell (PCell) change in CA, policy and charging control (PCC) change in PCC, for example. In an idle or low activity state, an example of cell change is cell reselection. In another example, the UE may itself use radio measurements for performing tasks, such as cell selection or cell reselection, for example.

Similar to a UE, a radio network node (e.g., an eNB) may also perform various types of measurements to support related functions, such as mobility (e.g. cell selection, handover, etc.), positioning a UE, link adaption, scheduling, load balancing, admission control, interference management, interference mitigation. These measurements are generally performed on signals transmitted and/or received by the radio network node, and may include, for example, signal-to-noise ratio (SNR), signal-to-interference-plus-noise ratio (SINR), received interference power (RIP), block error rate (BLER), propagation delay between UE and the radio network node, transmit carrier power, transmit power of specific signals (e.g. TX power of reference signals), and positioning measurements.

SUMMARY

In one embodiment of the disclosed subject matter, a method controls UL/DL switching for half-duplex operation of UE in which UL and DL transmissions occur on different frequencies. The method comprises determining a duration of time required for the UE to switch between UL operation and DL operation, determining a time interval required by the UE to perform a measurement operation, determining a minimum number of subframes required for the measurement operation in the time interval, and controlling a switching configuration of the UE based on the determined duration of time, the determined time interval, and the minimum number of subframes.

In some related embodiments, the minimum number of subframes comprises at least one of at least a downlink subframe #0 or a downlink subframe #5 per radio frame required for downlink radio measurements, at least one downlink subframe per radio frame required for radio link monitoring, at least one downlink subframe per radio frame or one uplink subframe per radio frame required for a UE RX-TX time difference measurement, and at least one positioning reference signal (PRS) subframe per PRS positioning occasion required for RSTD measurement.

In some related embodiments, controlling the switching configuration comprises adapting uplink and/or downlink scheduling to enable availability of the minimum number of subframes at the UE for the measurement operation.

In some related embodiments, the method further comprises controlling the switching configuration such that the UE conforms to at least one pre-defined condition among the following: at most a first number of DL physical signals are lost or do not occur during the time interval, at most a second number of DL common physical channels are lost or do not occur during the time interval, at most a third number of DL dedicated physical channels are lost or do not occur during the time interval, at most a fourth number of UL physical signals are lost or do not occur during the time interval, at most a fifth number of UL common physical channels are lost or do not occur during the time interval, and at most a sixth number of UL dedicated physical channels are lost or do not occur during the time interval. The at least one pre-defined condition may be met, for instance, where at least one of downlink subframe #0 and downlink subframe #5 of an LTE radio frame is available for a measurement operation during the time interval.

In some related embodiments, the method further comprises determining whether the UE is capable of or configured to operate in HD-FDD mode, and controlling the switching configuration as a consequence of determining that the UE is capable of or configured to operate in HD-FDD mode.

In some related embodiments, the measurement operation comprises at least one of an RSRP measurement, an RSRQ measurement, an RSTD measurement, and a UE RX-TX time difference measurement.

In some related embodiments, the duration of time comprises a time required for the UE to switch between a UL subframe or time slot of an LTE radio frame and a DL subframe or time slot of the LTE radio frame.

In some related embodiments, the measurement operation is an intra-frequency measurement performed with respect to a non-serving cell of the UE. The measurement operation may be performed, for instance, while the UE is in a DRX mode.

In some related embodiments, controlling the switching configuration of the UE comprises operating a serving cell associated with the UE to schedule UE transitions between UL and DL operation. Controlling the switching configuration of the UE may comprise, for instance, transmitting information indicating the switching configuration from the serving cell to the UE.

In some related embodiments, determining the time interval required by the UE to perform the measurement operation comprises determining a start time and a duration of the measurement operation.

In some related embodiments, the method further comprises transmitting information indicating the switching configuration from a first network node to a second network node, wherein the second network node is not the UE and is not a node controlling the switching configuration of the UE. The first network node may be, for instance, the UE, and the second network node may be another UE or a non-serving cell.

In some related embodiments, determining the duration of time required for the UE to switch between UL operation and DL operation comprises retrieving, from a memory in a network node, previously stored information indicating the duration.

In some related embodiments, determining the duration of time required for the UE to switch between UL operation and DL operation comprises measuring the duration.

In some related embodiments, the switching configuration is such that the UE avoids switching between UL operation and DL operation while the measurement operation is performed.

In another embodiment of the disclosed subject matter, a method operates UE in HD-FDD mode, wherein UL and DL transmissions occur on different frequencies. The method comprises determining a time interval required by the UE to perform a measurement operation, determining a minimum number of subframes required for the measurement operation in the time interval, determining a switching configuration for the UE to switch between an UL operation and a DL operation, determining a duration of time required for the UE to switch between the UL operation and the DL operation, and performing at least one radio measurement over the determined time internal based on the determined minimum number of the subframes and the determined switching configuration, wherein the switching between UL and DL operations is performed within the determined switching duration.

In yet another embodiment of the disclosed subject matter, a network node is configured to control UL/DL switching configuration of UE for HD-FDD operation in a radio communication system. The network node comprises a control module configured to determine a duration of time required for the UE to switch between UL operation and DL operation, determine a time interval required by the UE to perform a measurement operation, determine a minimum number of subframes required for the measurement operation in the time interval, and control a switching configuration of the UE based on the determined duration of time, the determined time interval, and the minimum number of subframes.

In still another embodiment of the disclosed subject matter, UE is configured to operate in HD-FDD mode and comprises a communication module configured to communicate with a radio network node using a switching configuration based on a determined duration of time required for the UE to switch between UL operation and DL operation, a determined time interval required by the UE to perform a measurement operation, and a determined a minimum number of subframes required for the measurement operation in the time interval.

BRIEF DESCRIPTION OF THE DRAWINGS

The drawings illustrate selected embodiments of the disclosed subject matter. In the drawings, like reference labels denote like features.

FIG. 7D is a diagram illustrating a fourth configuration of a system performing the method of FIG. 6.

DETAILED DESCRIPTION

Figure 1:
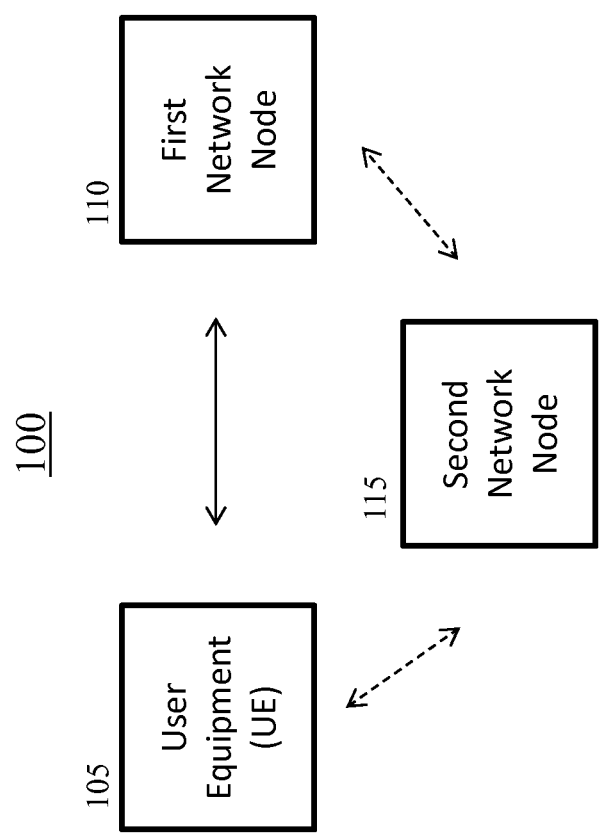
FIG. 1 is a block diagram illustrating an example system context in which certain embodiments may be implemented.

The following description presents various embodiments of the disclosed subject matter. These embodiments are presented as teaching examples and are not to be construed as limiting the scope of the disclosed subject matter. For example, certain details of the described embodiments may be modified, omitted, or augmented without departing from the scope of the described subject matter.

In general, the disclosed subject matter provides certain methods and apparatuses for controlling and/or performing UL/DL switching in HD-FDD communication. In some embodiments, the UL/DL switching is controlled and/or performed by determining a duration of time required for the UE to switch between UL operation and DL operation, determining a time interval required by the UE to perform a measurement operation, determining a minimum number of subframes required for the measurement operation in the time interval, and controlling a switching configuration of the UE based on the determined duration of time, the determined time interval, and the minimum number of subframes.

In some embodiments, the minimum number of subframes comprises at least one of (a) at least a downlink subframe #0 or a downlink subframe #5 per radio frame required for downlink radio measurements, (b) at least one downlink subframe per radio frame required for radio link monitoring, (c) at least one downlink subframe per radio frame or one uplink subframe per radio frame required for a UE RX-TX time difference measurement, and (d) at least one PRS subframe per PRS positioning occasion required for RSTD measurement.

In some embodiments, controlling the switching configuration comprises adapting uplink and/or downlink scheduling to enable availability of the minimum number of subframes at the UE for the measurement operation.

In some embodiments, the method further comprises controlling the switching configuration such that the UE conforms to at least one pre-defined condition among (a) at most a first number of DL physical signals are lost or do not occur during the time interval, (b) at most a second number of DL common physical channels are lost or do not occur during the time interval, (c) at most a third number of DL dedicated physical channels are lost or do not occur during the time interval, (d) at most a fourth number of UL physical signals are lost or do not occur during the time interval, (e) at most a fifth number of UL common physical channels are lost or do not occur during the time interval, and (f) at most a sixth number of UL dedicated physical channels are lost or do not occur during the time interval.

The switching configuration may require a downlink subframe #0 or #5 of an LTE radio frame of an intra-frequency cell to be identified by the UE to be available at the UE during the time interval. It may also require at least one downlink subframe of an LTE radio frame of a cell corresponding to the measurement operation to be available at the UE for an RSRP or RSRQ measurement.

The duration of time typically comprises a time required for the UE to switch between a UL subframe or time slot of an LTE radio frame and a DL subframe or time slot of the LTE radio frame. The measurement operation may be, for instance, an intra-frequency measurement performed with respect to a non-serving cell of the UE. The switching configuration may require, for instance, switching between UL and DL subframes containing signals at least a predetermined time T0 before a subframe (e.g. UL or DL) in which the UE is required to receive or transmit specific signals (e.g. PSS/SSS, SRS, etc.), or use specific signals for doing measurement.

The switching configuration is typically generated by a scheduling function of a serving cell (e.g., an eNB) or other network node. The switching configuration may be transmitted from the serving cell or other network node to a UE to control switching between UL and DL communications. It may also be transmitted between various other network nodes, e.g., from a first network node to a second network node, where the second network node is not the UE and is not a node controlling the switching configuration of the UE. In such embodiments, the first network node may be the UE having the switching configuration, another UE, or another network node such as a non-serving cell.

The described embodiments may provide various benefits compared to conventional approaches. For example, where a conventional radio node (e.g., UE or a radio network node) performs a measurement for a UE while a switching between UL/DL subframes occurs (e.g., in an uncontrolled way or in the way unknown to the measuring node), some signals or channels used for the measurement may be lost and thus the measurement performance may be degraded. In contrast, the described embodiments may avoid such degradation.

At least the following problems may be envisioned when UL/DL switching occurs in a conventional UE operating in HD-FDD mode when UL and DL are on separate carrier frequencies. Switching from DL to UL or from UL to DL may result the UE operating in HD-FDD mode not being able to receive some signals or channels in DL, which may be especially problematic where the DL signals are transmitted sparsely and/or are not dynamically controlled by the network (e.g., being configured by a pattern or semi-statically configured). A UE's inability to receive these DL signals/channels may degrade measurements that involve at least DL (e.g., synchronization or time tracking based on PSS/SSS or based on some reference signals; positioning measurements based on PRS that are transmitted in positioning occasions that are at least 160 ms apart; bidirectional measurements such as round trip time [RTT] or Rx-Tx), or it may result in that UE is not meeting the existing requirements.

A UE's inability to receive these DL signals/channels may result in a lost DL grant or UL grant, or it may result in the UE not meeting existing requirements. It may also result in a lost network response (e.g., ACK/NACKs transmitted in DL in response to UE UL transmissions) or in the UE not meeting the existing requirements. Switching from DL to UL or from UL to DL may result in a UE operating in HD-FDD mode not being able to transmit some signals or channels in UL (and thus the expected receiving node not being able to receive them), which may be especially problematic where the UL signals or channels are transmitted sparsely and/or are not dynamically scheduled by the network (e.g., being configured by a pattern or semi-statically configured). This may degrade measurements that involve at least UL or the UE may not meet the existing requirements (e.g., measurement period, measurement accuracy, number of transmitted ACK/NACKs, etc.). For example, UE may be not able to transmit SRS or PRACH; it may not be able to respond to the network (e.g., to acknowledge a signal/channel received in DL); it may not able to transmit some signals/channels related to D2D operation; or it may not be able to transmit a UL transmission scheduled by the network in general.

A radio network node receiving a UE's UL transmissions (e.g., a non-serving eNB, a non-primary cell, a radio node performing positioning measurements such as an LMU, etc.) may be different from the network node scheduling the UE or controlling the switching in the UE (e.g., serving eNB) and may not dynamically know that the UE was not able to transmit some UL signals/channels due to the switching or may not be even aware at all that the UE is operating in HD-FDD mode. This would lead to degraded measurement performance or reception failure at this receiving radio node.

FIG. 1 is a block diagram illustrating a system 100 in which certain embodiments may be implemented.

Referring to FIG. 1, system 100 comprises user equipment (UE) 105, a first network node 110, and a second network node 115. These features may reside in a network using any available network technology, such as e.g., an LTE network, a Universal Terrestrial Radio Access (UTRA) network, a channel division multiple access (CDMA) network, WiMAX network, a GSM network, or a network employing any one or more radio access technologies (RATs) for cellular operation.

Certain embodiments will be described herein with reference to a network using LTE RAT, but the described concepts are not limited to this or any other specific technology. Alternative RATs include, for instance, GSM, CDMA, WCDMA, WiFi, WLAN, and WiMAX. Moreover, although not shown in FIG. 1, certain operations described herein could be implemented through network function virtualization (NFV) or other forms of abstraction, e.g., in a cloud context. For example, the determination of a switching configuration or controlling of the switching configuration may be performed through a cloud type infrastructure.

A network node, such as those illustrated in FIG. 1, may be a radio network node or another type of network node. Some examples of radio network nodes include a radio base station, a relay node, an access point, a cluster head, RRH, DAS, RNC, etc. A radio network node resides in a wireless communication network and may also support cellular operation. Some examples of network nodes that are not radio network nodes include a core network node, SON node, O&M node, positioning node, a server, an application server, an external node, or a node comprised in another network. In certain embodiments described herein, it will be assumed that first network node 110 is a serving network node (e.g., an eNB) for UE 105, and second network node 115 is a non-serving network node for UE 105.

A UE, such as that illustrated in FIG. 1, may be any entity capable of at least receiving or transmitting radio signals either via a direct link (e.g., between two UEs), via a link to a radio network, or both. A UE may comprise, for instance, a radio receiver, a cellular UE, a wireless device, a PDA, laptop, an MTC device, a sensor, a relay, a device-to-device (D2D) relay, or even a small base station (BS), a radio network node, or another device employing a UE-like interface, for example. In certain embodiments described herein, it will be assumed that UE 105 comprises an MTC device operating in HD-FDD mode.

During typical operation of system 100, first network node 110 performs scheduling operations that define a switching configuration of UE 105. Such scheduling operations generally require that UE 105 does not switch between UL communication and DL communication (e.g., i.e., from DL to UL or from UL to DL) while a measurement operation is performed. For example, it may require that switching occurs at least a predetermined time T0 before a measurement operation is performed, where the predetermined time T0 corresponds to a switching time required to transition between a UL subframe or time slot and a DL subframe or time slot of an LTE radio frame. Once the switching configuration is defined, first network node 110 may control switching by UE 105 by transmitting the defined switching configuration to UE 105. Additionally, the switching configuration may be transmitted to second network node 115, which can be any network node other than UE 105 or first network node 115. In general, transmission or signaling between the features of system 100 may comprise signaling via the physical layer or a higher layer, via direct link or logical link (e.g., via another node, another network node, device, hop, etc.), via radio and/or fixed interface, via control plane and/or user plane.

A measurement operation performed by UE 105 may comprise any measurement involving at least receiving a radio signal or channel. The measurement operation may be one-directional (e.g., on either DL or UL radio signals) or bi-directional (e.g., on DL and UL radio signals). Some examples of bi-directional measurements are RTT, UE Rx-Tx, and eNB Rx-Tx. The radio measurements may be power-based measurements (e.g., received signal strength such as RSRP, received signal quality such as RSRQ, path loss), timing measurements (time difference such as RSTD, time of arrival such as UL RTOA, propagation delay), etc. The radio measurements may be performed for different purposes, e.g., radio resource measurement (RRM), mobility, MDT, SON, positioning, etc.

The functions performed by each or any of the features shown in FIG. 1 could be implemented through the use of a control module or unit. Such a control module or unit could comprise, for instance, a processor in combination with a memory. It may further comprise other features such as one or more communication interfaces, a receiver, transmitter, etc. Similarly, other functions described below with reference to FIGS. 2 through 7 could likewise be implemented through the use of a control module or unit as described herein.

Figure 2:
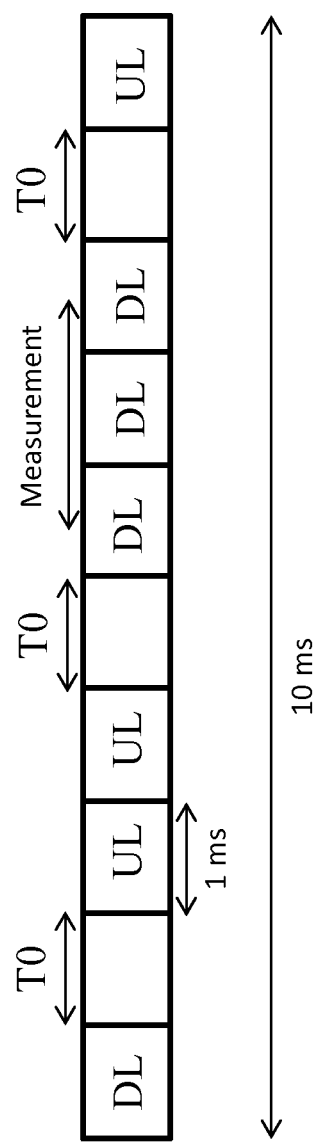
FIG. 2 is a conceptual diagram illustrating a radio frame comprising several UL and DL frames, and further illustrating a switching time T0 and a measurement occurring in relation to the radio frame.

FIG. 2 is a block diagram illustrating a radio frame comprising several UL and DL frames, and further illustrating a switching time T0 and a measurement occurring in relation to the radio frame. In the example of FIG. 2, the radio frame is an LTE frame comprising ten subframes each having duration of 1 ms. The radio frame represents communication performed by UE 105 while operating in HD-FDD mode, where UL and DL transmissions take place in different time resources, e.g. time slots or subframes.

The number and location of subframes used for DL, UL or unused subframes can vary on the basis of frame or multiples of frames. For example, in one radio frame (say frame #1—shown in FIG. 2) subframes #0, #5 and #6 and #7 are used for DL and subframes #2, #3 and #9 are used for UL transmission. In another frame (say frame #2—not shown in the drawings), subframes #0 and #5 are used for DL and subframes #2, #3, #7 and #8 are used for UL transmission.

A switching time T0 is required to switch between DL communication and UL communication. In FIG. 2, switching time T0 is shown as having the same duration as a subframe, but in practice it may have smaller or greater duration. In the illustrated example, a measurement operation is performed during a time interval in which switching does not occur, i.e., during a time interval that does not overlap with switching time T0.

A UL/DL switching configuration for a UE may be characterized by any of several different properties, which may be conveyed by certain types of switching configuration information. The following are non-limiting examples of such information.

Switching configuration information may comprise a pattern describing a sequence of at least one UL and one DL time unit in a certain order (e.g., symbols, radio frame, subframe, or slot). It may comprise a reference time for the configuration or the pattern describing a sequence of at least one UL and one DL time unit. It may comprise a validity time ($T_v$) or duration over which the pattern is applicable or valid for use by the UE. The validity time $T_v$ can be pre-defined or autonomously selected by a network node. For example, the validity time can be a time period, a plurality of consecutive subframes, one radio frame or plurality of consecutive radio frames etc. The switching configuration information may comprise a periodicity of the pattern e.g. one period equal to one radio frame, a plurality of radio frames etc. It may comprise an event, a process, or a procedure of changing/transition from UL operation to DL operation and/or vice versa. It may comprise one or more time points at which a change from UL to DL operation and/or vice versa should occur. It may comprise an action/command/event triggering or initiating one or a sequence of UL/DL switchings. It may comprise a frequency band or carrier frequency to which the switching applies (e.g., [DL on frequency f1][UL on frequency f2] or [DL on frequency f1][UL on frequency f2][UL on frequency f3] or [DL on frequency f1][UL on frequency f2][UL on frequency f3][DL on frequency f4]).

The following are example approaches for defining or determining a switching configuration. It may be autonomously determined by the network node (e.g. based on UL and DL data in the buffer), it may be pre-defined within the network node and accessed from memory, and it may be defined based on a configuration used in another node or configuration information received or recommended by the UE or another network node (e.g. O&M, SON, etc.).

Figure 3:
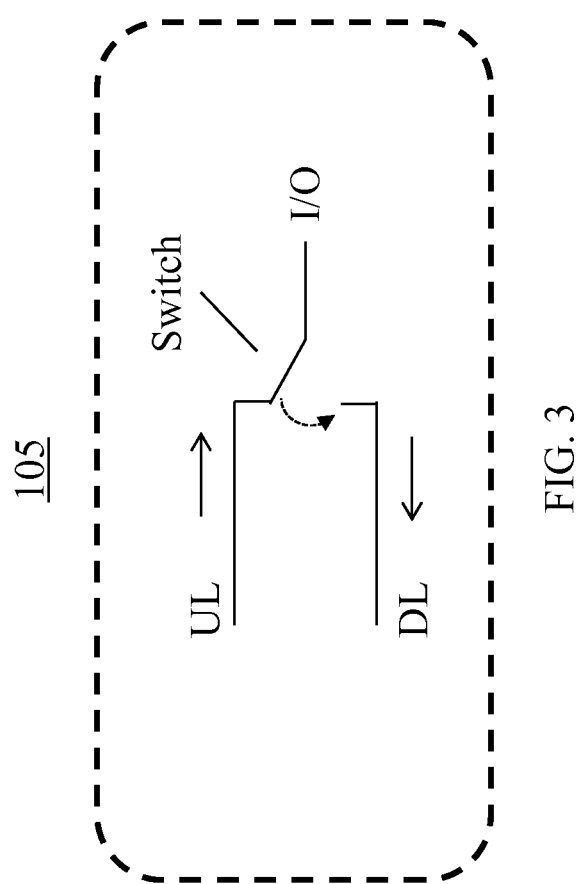
FIG. 3 is a conceptual diagram illustrating an example component for switching between UL and DL communication in the system of FIG. 1.

FIG. 3 is a conceptual diagram illustrating an example component for switching between UL and DL communication in system 100 of FIG. 1. This example is provided as a conceptual illustration of switching in a UE operating in HD-FDD mode, but should not be construed as limiting the actual switching mechanism, which can take any of various alternative forms.

Referring to FIG. 3, a transition between UL and DL subframes is performed by a switching action. In a typical LTE based system, this switching occurs in the context of communication between the UE operating in HD-FDD mode and a base station operating in FD-FDD mode. The switching causes interruption due to change in the frequency of operation and also to account for timing advance, which in turn depends on a maximum cell range. Therefore certain times, e.g., subframes, may be unused to account for switching between UL and DL subframes. These unused subframes are usually between UL and DL subframes, as in the radio frame of FIG. 2, for example.

Typically, the number of the unused subframes would vary between 1 to 2 depending upon UE implementation and cell size. The frequency of occurrence of unused subframes generally depends upon the carrier frequency with which the switching is performed. Switching between UL and DL subframes may be done dynamically, i.e., as frequent as after every UL or DL subframe. In this case, switching is typically realized by scheduling i.e. sending grant to the UE for UL or DL scheduling in PDCCH. Switching between UL and DL subframes may also be done on static or semi-static basis. In this case the UE can be configured with a pattern of UL and DL subframes by the network node or it may use a pre-defined pattern of UL and DL subframes.

Figure 4:
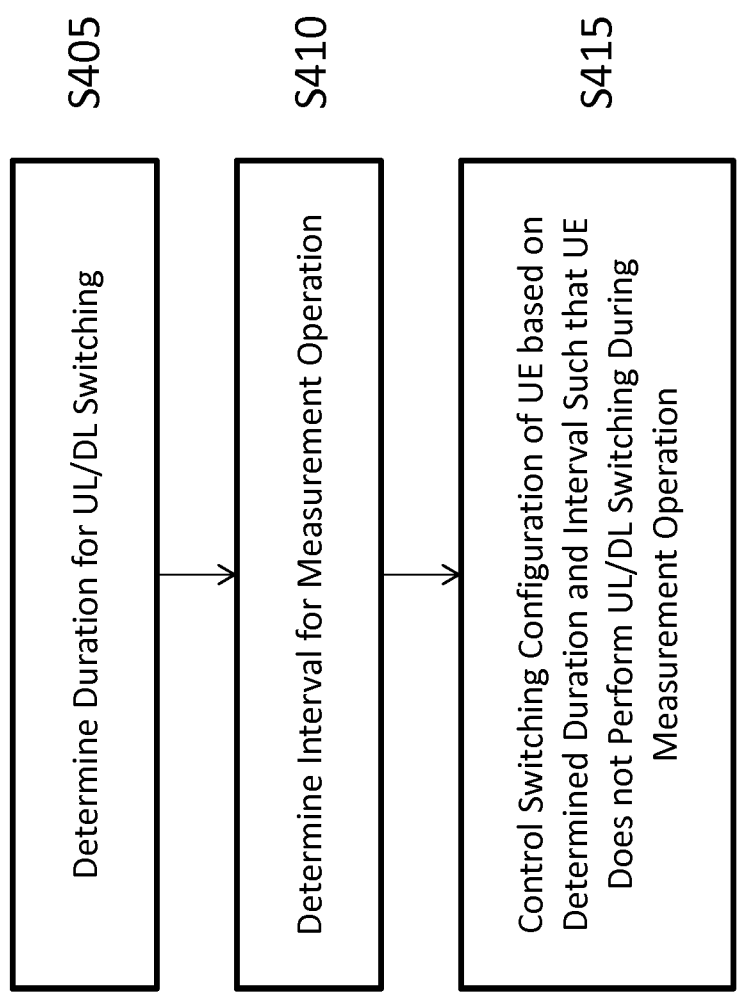
FIG. 4 is a flow diagram illustrating a method of controlling UL/DL switching for half-duplex operation of UE in which UL and DL transmissions occur on different frequencies.

FIG. 4 is a flow diagram illustrating a method of controlling UL/DL switching for half-duplex operation of a UE in which UL and DL transmissions occur on different frequencies. In this method, the bandwidths of the UL and DL transmissions may be the same or different. The method of FIG. 4 could be performed, for instance, by first network node 110 of FIG. 1.

Referring to FIG. 4, the method comprises determining a duration of time required for the UE to switch between UL communication and DL communication (S405), determining a time interval for the UE to perform a measurement operation (S410), and controlling a switching configuration of the UE based on the determined duration of time and the determined time interval such that the UE does not switch between UL communication and DL communication while the measurement operation is performed (S415). The controlling of the UL/DL switching configuration is typically performed through operation of a network node (e.g., an eNB) that schedules communication by the UE. As part of, or in addition to S410, the method may also determine a minimum number of subframes required for the measurement operation in the time interval. This information may be used in conjunction with other information in S415 to ensure that the UE does not switch between UL communication and DL communication while the measurement operation is performed.

In some embodiments, the network node, prior to controlling the switching configuration, obtains information about the duration of time required for switching between the UL and the DL (e.g., between UL and DL subframes or slots). The obtaining of this information may comprise of one or more of the following. In some embodiments, the switching time T0 is pre-defined, e.g. in a standard or specification, and information indicating the predefined time may be retrieved from a memory of the network node. In some other embodiments, the information may be obtained autonomously by the network node (e.g., based on measurements and/or history) or based on the data or information related to switching time T0 received from another node (e.g. another network node or UE). For example, the network node may receive this information from a neighboring network node, O&M, SON node etc. In still other embodiments, the network node may receive the information from the UE or a plurality of UEs. The network node may also use statistics of switching time T0 received from several nodes to select one value of switching time T0. Alternatively, the controlling may be based on the UL/DL switching information and/or a command received from another node.

The obtaining of information and/or controlling may be further preceded by determining whether the UE is or will be operating in the HD-FDD mode or at least whether the UE is capable of HD-FDD operation. Under these circumstances, the controlling may be performed as a consequence of determining that one or more of these contingencies are met. The determining may also comprise determining that the UE is in a specific activity state, e.g., an RRC state such as RRC IDLE or RRC CONNECTED.

The controlling may also be based on one or more pre-defined rules, conditions, or constraints. For example, the controlling may be performed to ensure that no more than a certain number (Max) of DL and/or UL signals or time units containing them in a cell are lost by the UE due to switching between UL and DL time units (i.e. UL/DL switching). In this context, the cell refers to a cell in which the UE transmits and/or receives signals, e.g. a serving cell. The cell can also be neighboring cell in which the UE transmits and/or receives signals, e.g. a neighboring cell on whose signals the UE performs one or more measurements. The network node controls the switching configuration such that switching time T0 does not coincide with one or more time units that contain certain signals which should be received and/or transmitted by the UE in a certain cell (e.g. measured cell, which can be serving or neighboring).

The DL/UL signals can be DL/UL physical signals and/or physical channels. To ensure that no more than Max signals are lost, the network node may perform switching between UL and DL subframes at least T0 before the time unit (e.g. before the subframe) that needs to be received and/or transmitted by the UE in a cell. In this way the required signals (e.g. PSS/SSS, SRS, PBCH, etc.) are not lost or destroyed at the UE and therefore the UE can perform the measurement or receive or transmit them.

The controlling may be further performed by the network node to ensure that UL and DL subframe configuration performed in one cell does not interfere with signals to be received and/or transmitted by the UE from another cell. The network node may achieve this by further taking into account the signals transmitted in one or more neighboring cells of the UE and the UL and DL subframe configuration used in the serving cell of the UE. For example, the network node may ensure that UL-DL switching done in the serving cell does not lead to loss of necessary signals or time units (e.g. subframes #0 and #5) in one or more neighboring cells. In this case the network node may perform switching between UL and DL subframes in the serving cell of the UE at least switching time T0 ahead of signals or time units which the UE should receive and/or transmit in another cell (e.g. neighbor cell, reference cell etc). In still other embodiments, the network node may align their UL and DL subframe configurations to ensure that the switching does not lead to loss of certain signals that are needed by the UE for doing measurements. The switching and UL/DL subframe alignment may be done for a subset of UEs in a cell, e.g., for one or more UEs supporting HD-FDD or involved in MTC.

The controlling may be further performed to meet one or more requirements or conditions related to receiving and/or transmitting radio signals/channels in DL and UL, respectively, by the UE operating in HD-FDD mode. The controlling may be performed for one or a group of UEs. The one or two requirements to be met can further be related to one or more measurements performed by the network node and/or by another node (e.g. UE) on radio signals/channels transmitted and/or received by the UE. Examples of requirements related to measurements are measurement time (e.g. L1 measurement period, cell identification delay, measurement reporting delay, etc.), measurement accuracy, number of identified cells to measure, etc.

The controlling may still further comprise informing or instructing the UE to perform the UL/DL switching according to a UL/DL switching configuration determined by the controlling. This may be implemented e.g. by means of dynamic or semi-static scheduling or by pre-configuration. In still further embodiments, the network node may signal a result of the UL/DL switching controlling (e.g., an UL/DL switching configuration) to another network node, the UE, or another UE.

The following explains certain additional conditions that may be used as bases for controlling the switching configuration of the UE. Under one set of conditions, the switching configuration is controlled such that at most N1 (=0, 1, 2, . . . ) DL physical signals are lost (by the UE) or do not occur (not configured by the network) during the switching time T0 in a cell (serving or neighbor, e.g. a measured cell). The DL physical signals may be common (e.g., the same for all UEs in a cell or area) or UE-specific. Some examples of the DL physical signals are synchronization signals (e.g., PSS/SSS), and reference signals (e.g., PRS, CRS in normal subframes, CRS in MBSFN subframes, PRS, DM-RS, CSI-RS, MBSFN RS).

Under another set of conditions, the switching configuration is controlled such that at most N2 (=0, 1, 2, . . . ) DL physical channels are lost or do not occur during switching time T0 in a cell (serving or neighbor e.g. measured cell). The DL physical channels may comprise, for example, common and/or dedicated channels; broadcast, multicast/groupcast, or unicast channels; data channels or control channels; PBCH, paging channel, physical channel containing system information (SI); or ACK/NACK to one or more receptions in UL. Some examples of the DL physical channels are PDSCH, PDCCH, PHICH, PCFICH, E-PDCCH and PBCH.

Under yet another set of conditions, the switching configuration is controlled such that at most N3 (=0, 1, 2, . . . ) UL physical signals are lost (by the network or by another UE) or do not occur (not transmitted by the UE) during switching time T0 in a cell (serving or neighbor e.g. measured cell). Some examples of the UL physical signals are reference signals (e.g., demodulation reference signals or SRS). The UL physical signals may be D2D-related physical signals (e.g., D2D synchronization or reference signals).

Under still another set of conditions, the switching configuration is controlled such that at most N4 (=0, 1, 2, . . . ) UL physical channels are lost (by the network or by another UE) or do not occur (not transmitted by the UE in HD-FDD mode) during switching time T0. The UL physical channels may comprise common or physical channels, D2D-related physical channels (e.g., D2D data channel, D2D synchronization channel, D2D control channel), PRACH, a data channel (e.g. PUSCH), or a control channel (e.g. PUCCH). The UL physical channels may also be broadcast, multicast/groupcast, or unicast channels, and they may comprise feedback information (e.g. ACK/NACK) related to one or more UE receptions in DL.

To preserve at least a certain number of UL and/or DL signals at the UE in the above examples, the switching between UL and DL subframes is typically initiated at least switching time T0 before the start of the DL or UL subframes which the UE is required to use for reception, transmission or doing measurements.

Figure 5:
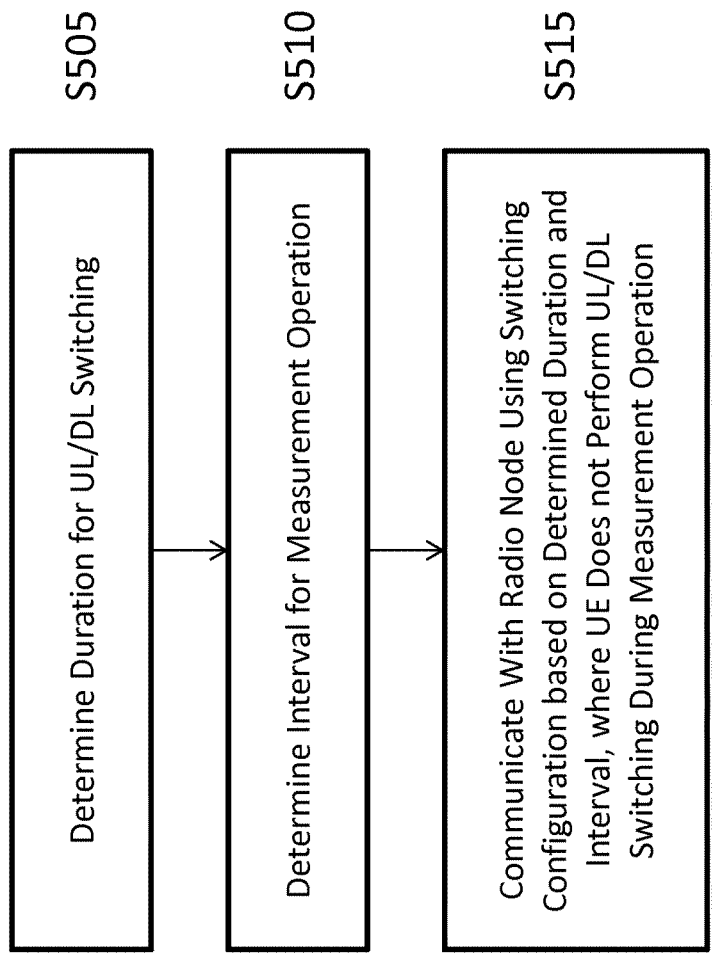
FIG. 5 is a flow diagram illustrating a method of operating a radio node to perform a measurement for a UE configured to operate in HDD where UL and DL transmissions take place on different frequencies.

FIG. 5 is a flow diagram illustrating a method of operating a radio node to perform a measurement for a UE configured to operate in HDD where UL and DL transmissions take place on different frequencies. The method of FIG. 5 could be performed, for instance, by UE 105 of FIG. 1, or by another radio node performing a radio measurement based at least on radio signals transmitted by UE 105. The other radio node could be, for example, an eNB serving UE 105 and performing a measurement operation such as an eNB Rx-Tx time difference measurement.

Referring to FIG. 5, the method comprises determining a duration of time required for the UE to switch between UL communication and DL communication (S505), determining a time interval for the UE to perform a measurement operation (S510), and communicating with a radio network node using a switching configuration based on the determined duration of time and the determined time interval, wherein the switching configuration is such that the UE does not switch between UL communication and DL communication while the measurement operation is performed (S515).

The measurement operation may be further required to meet one or more additional pre-defined requirements (e.g., measurement accuracy requirement, measurement time requirement, minimum number of reported ACK/NACKs, etc.). In some embodiments, such requirements may be the same as those for measurement operations performed without the switching (e.g., same accuracy, etc.). In other embodiments, the requirements may be different.

A result of the measurement operation may comprise, e.g., a measurement that meets one or more pre-defined requirements, a measurement that does not meet at least one pre-defined requirement, a measurement error or measurement failure. The result may be used in various alternative ways, e.g., it may be logged by the radio node and stored for a certain (pre-defined or configured) time; it may be further reported to another node; or it may be used by the radio node internally for one or more purposes (e.g., RRM, positioning, SON, MDT).

In certain alternative embodiments, the method further comprises determining that UL/DL switching partly or fully occurs over a measurement period D1 over which the radio node performs the measurement operation, performing the measurement operation where the measurement time overlaps with the switching time, at least in part, while meeting a pre-defined requirement, and using the measurement result.

In some embodiments, the measurement operation may be performed in the following way. It may be performed over a period D1 and a bandwidth (BW1) provided that the number of occurrences of at least one DL transmission and/or one UL transmission overlapping with the switching time T0 does not exceed a threshold (H), and otherwise it may be performed over an extended period D2 and/or over a larger bandwidth (BW2), wherein D2>D1 and BW2>BW1. Under these circumstances, the DL transmission may be any of a DL physical signal or DL physical channel, and the UL transmission is any of: UL physical signal or UL physical channel.

The following are examples of pre-defined rules that may be used in relation to various measurement operations as described herein. These rules may be used, for instance, to ensure that a radio node (e.g. UE or a radio network node) performs one or more measurements according to corresponding requirements. Some of these rules are described with reference to a UE, but may be similarly applied to a radio node in general.

In one example, a pre-defined rule specifies that an HD-FDD capable UE perform radio link monitoring (RLM e.g. out of sync and in sync detection etc.) and meet corresponding RLM pre-defined requirements provided at least one DL subframe per radio frame is available at the UE.

In another example, a pre-defined rule specifies that an HD-FDD UE perform mobility related intra-frequency RRM measurements (e.g. cell search, RSRP, RSRQ and CGI reading) and meet corresponding requirements provided certain number of subframes, or certain specific subframes or subframes with specific signals (e.g. DL subframe #0 and DL subframe #5) of the measured cell(s) are available at the UE. This rule recognizes that switching between UL and DL subframes may adversely affect reception and transmission of signals at the UE. Therefore, an eNB must ensure that the switching between UL-DL subframes does not partly or fully destroy DL subframes #0 and #5 and UL subframe(s) with SRS. This is achieved by the eNB performing switching at least switching time T0 before a start of DL subframes #0 and #5. Because measurement operations are also performed in relation to neighbor cells, the eNB also must ensure that DL subframe #0 and DL subframe #5 from the neighbor cells are also fully available at the UE.

In yet another example, a pre-defined rule specifies that an HD-FDD UE be able to perform UE Rx-Tx time difference measurement provided certain specific DL subframes or DL subframes with specific signals (e.g. DL subframe #0 and DL subframe #5) and/or at least certain number of UL subframes or UL subframes with specific signals (e.g. at least 2 UL subframes per radio frame, subframes containing SRS etc.) are available at the UE. This rule may be achieved by the eNB by performing a switching between UL and DL time units at least switching time T0 before the start of the DL subframes #0 and #5 and also switching time T0 before UL subframes with SRS or UL subframes that need to be sent.

In yet another example, a pre-defined rule specifies that an HD-FDD UE be able to perform RSTD and meet corresponding requirements provided a condition on a minimum number (Nmin) of PRS subframes or positioning subframes per positioning occasion in reference and neighbor cells is met, where Nmin depends upon the PRS bandwidth e.g. 6 PRS subframes for 1.4 MHz (i.e. 6 RBs) and 1 PRS subframe for 10 MHz (i.e. 50 RBs). This rule ensures that switching between UL and DL time units the UE does not result in a loss of the minimum number of PRS subframes during a positioning occasion or PRS positioning occasion. For example, eNB must ensure that the selected switching configuration does not prevent the UE from receiving the required Nmin.

In still another example, a pre-defined rule specifies that an HD-FDD UE be able to perform an inter-frequency or inter-RAT measurement and meet corresponding requirements provided that a certain number of DL subframes are available in the measured cell within a measurement gap (e.g., at least 4 full DL subframes are available within each measurement gaps).

Figure 6:
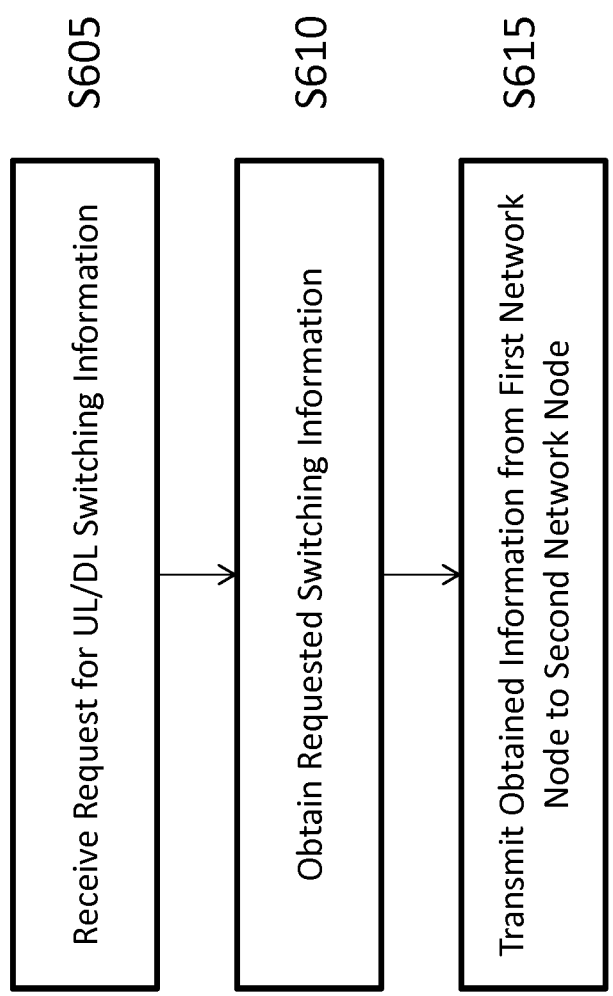
FIG. 6 is a flow diagram illustrating a method of providing UL/DL switching information for a UE operating in HD-FDD mode from a first network node to a second network node.

FIG. 6 is a flow diagram illustrating a method of providing UL/DL switching information for a UE operating in HD-FDD mode from a first network node to a second network node, where the second network node is not the UE and not a network node scheduling transmissions by the UE. This method could be performed, for instance, by UE 105 or first network node 110 providing UL/DL switching information to second network node 115. The UL/DL switching information could be provided upon a request, a condition, a triggering event, or various other circumstances. The method of FIG. 6 may also be performed in conjunction with the method of FIG. 4 or 5, for example.

Referring to FIG. 6, the method comprises receiving a request for UL/DL switching information at a first network node from a second network node (S605), obtaining the switching information autonomously or from another network node (S610), and transmitting the obtained information from the first network node to the second network node (S615).

In the method of FIG. 6, the first and second network nodes may take any of various alternative forms. For example, FIGS. 7A through 7E illustrate different system configurations in which the method of FIG. 6 may be performed.

Figure 7A:
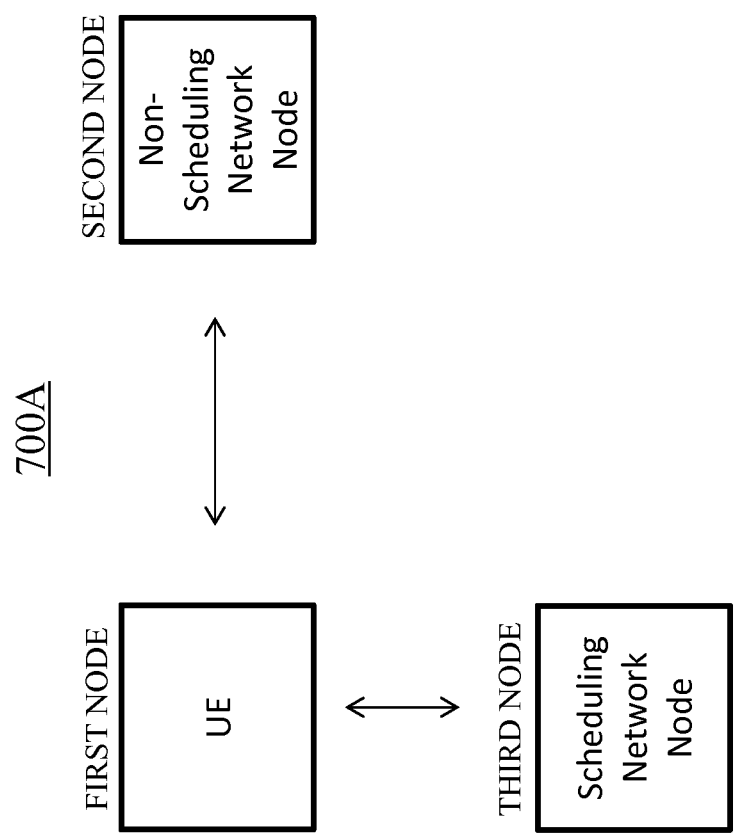
FIG. 7A is a diagram illustrating a first configuration of a system performing the method of FIG. 6.

In the configuration illustrated in FIG. 7A, the first network node is a UE operating in HD-FDD mode, and the second network node is a network node that is not a serving eNB. The UE is connected to a third node, which is a network node that controls UL/DL switching of the UE. The second network node can be, for instance, a radio network node or a non-radio network node, such as a positioning node.

Figure 7B:
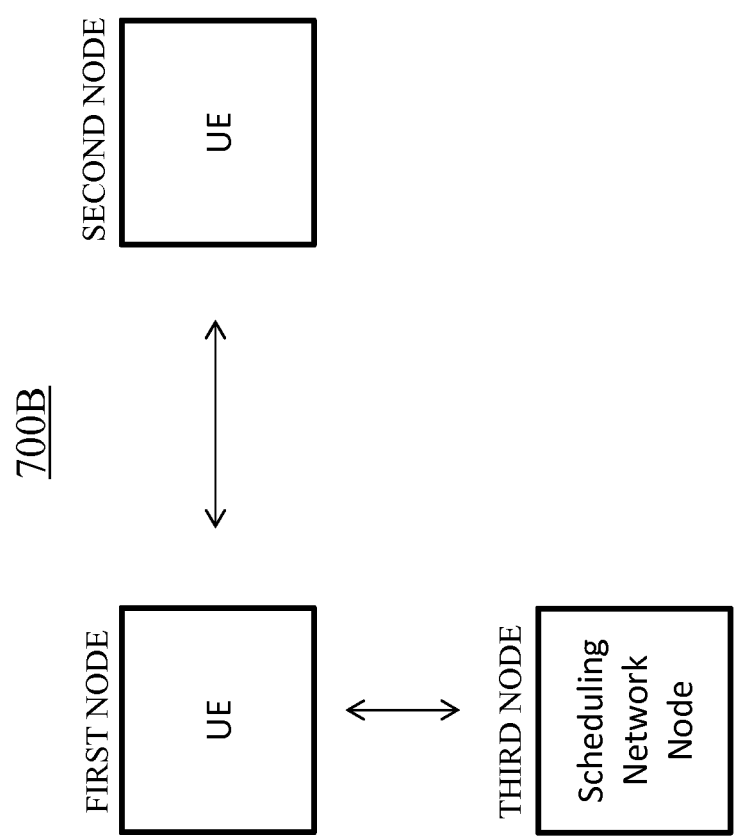
FIG. 7B is a diagram illustrating a second configuration of a system performing the method of FIG. 6.

In the configuration illustrated in FIG. 7B, the first network node is a UE operating in HD-FDD mode, and the second network node is another UE.

Figure 7C:
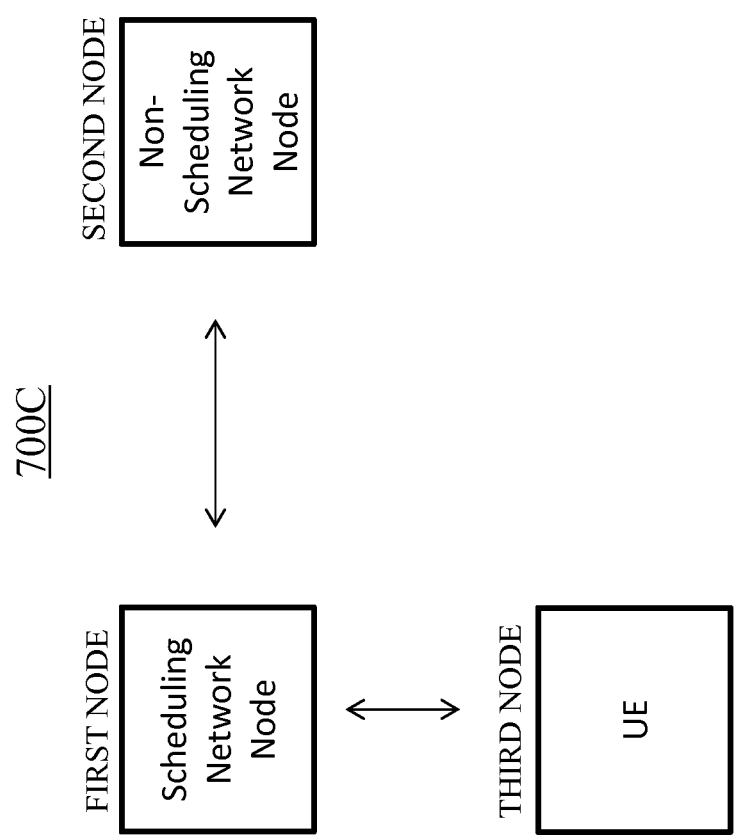
FIG. 7C is a diagram illustrating a third configuration of a system performing the method of FIG. 6.

In the configuration illustrated in FIG. 7C, the first network node is a network node, and the second network node is another network node. The first network node (e.g., an eNB) may or may not be scheduling the UE. For example, it may be a positioning node, a SON node, or an O&M node. Similarly, the second network node may be another eNB functioning as a positioning node, or another radio node performing positioning measurements.

In the configuration illustrated in FIG. 7D, the first network node is a network node, and the second network node is another UE. The network node (e.g., an eNB) may or may not be scheduling the UE.

Figure 7E:
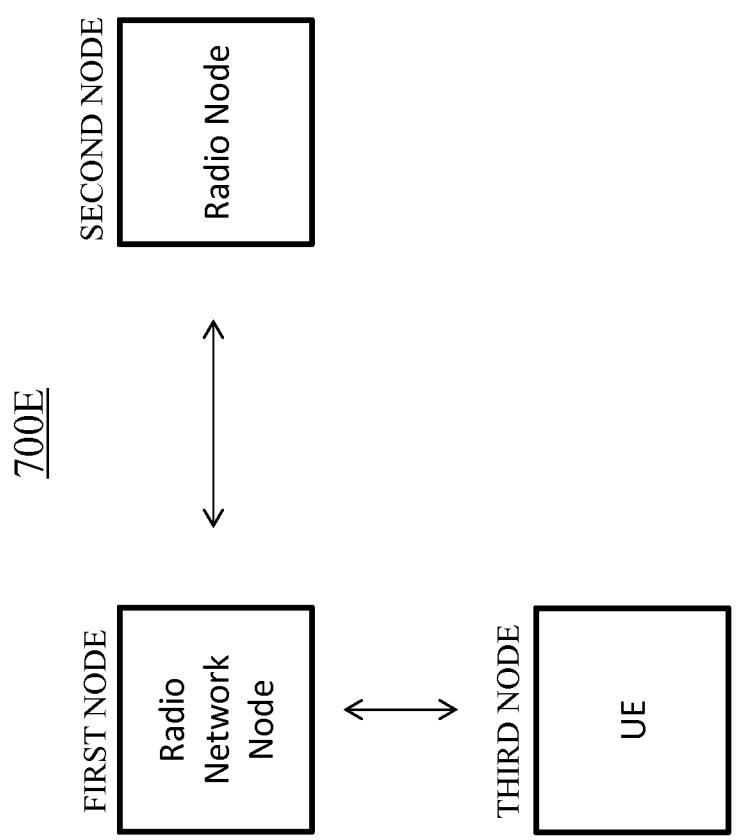
FIG. 7E is a diagram illustrating a fifth configuration of a system performing the method of FIG. 6.

In the configuration illustrated in FIG. 7E, the first network node is a radio network node, and the second network node is a radio node associated with the first network node. The radio network node (e.g., an eNB) is signaling to one or more elements of a distributed antenna system (DAS), a remote radio head (RRH), or another transmitter/receiver or transmitting/receiving node (e.g., another eNB) performing a joint transmission/reception with the first network node coordinated multipoint (CoMP), for example.

While the disclosed subject matter has been presented above with reference to various embodiments, it will be understood that various changes in form and details may be made to the described embodiments without departing from the scope of the invention as defined by the claims.

The invention claimed is:

1. A method of controlling uplink/downlink (UL/DL) switching for half-duplex operation of user equipment (UE) in which UL and DL transmissions occur on different frequencies, the method comprising:
   determining a duration of time required for the UE to switch between UL operation and DL operation;
   determining a time interval required by the UE to perform a measurement operation;
   determining a minimum number of subframes required for the measurement operation in the time interval;
   controlling a switching configuration of the UE based on the determined duration of time, the determined time interval, and the minimum number of subframes; and
   controlling the switching configuration such that the UE conforms to at least one pre-defined condition among the following:
   at most a first number of DL physical signals are lost or do not occur during the time interval;
   at most a second number of DL common physical channels are lost or do not occur during the time interval;
   at most a third number of DL dedicated physical channels are lost or do not occur during the time interval;
   at most a fourth number of UL physical signals are lost or do not occur during the time interval;
   at most a fifth number of UL common physical channels are lost or do not occur during the time interval; and
   at most a sixth number of UL dedicated physical channels are lost or do not occur during the time interval.

2. The method of claim 1, wherein the minimum number of subframes comprises at least one of:
   at least a downlink subframe #0 or a downlink subframe #5 per radio frame required for downlink radio measurements;
   at least one downlink subframe per radio frame required for radio link monitoring;
   at least one downlink subframe per radio frame or one uplink subframe per radio frame required for a UE receive-transmit (RX-TX) time difference measurement; and
   at least one positioning reference signal (PRS) subframe per PRS positioning occasion required for reference signal time difference (RSTD) measurement.

3. The method of claim 1, wherein controlling the switching configuration comprises adapting uplink and/or downlink scheduling to enable availability of the minimum number of subframes at the UE for the measurement operation.

4. The method of claim 1, wherein the at least one pre-defined condition is met where at least one of downlink subframe #0 and downlink subframe #5 of a Long Term Evolution (LTE) radio frame is available for a measurement operation during the time interval.

5. The method of claim 1, further comprising determining whether the UE is capable of or configured to operate in half-duplex frequency division duplexing (HD-FDD) mode, and controlling the switching configuration as a consequence of determining that the UE is capable of or configured to operate in HD-FDD mode.

6. The method of claim 1, wherein the measurement operation comprises at least one of a reference signal received power (RSRP) measurement, a reference signal received quality (RSRQ) measurement, a reference signal time difference (RSTD) measurement, and a UE receive-transmit (RX-TX) time difference measurement.

7. The method of claim 1, wherein the duration of time comprises a time required for the UE to switch between a UL subframe or time slot of a Long Term Evolution (LTE) radio frame and a DL subframe or time slot of the LTE radio frame.

8. The method of claim 1, wherein the measurement operation is an intra-frequency measurement performed with respect to a non-serving cell of the UE.

9. The method of claim 8, wherein the measurement operation is performed while the UE is in a discontinuous reception (DRX) mode.

10. The method of claim 1, wherein controlling the switching configuration of the UE comprises operating a serving cell associated with the UE to schedule UE transitions between UL and DL operation.

11. The method of claim 10, wherein controlling the switching configuration of the UE comprises transmitting information indicating the switching configuration from the serving cell to the UE.

12. The method of claim 1, wherein determining the time interval required by the UE to perform the measurement operation comprises determining a start time and a duration of the measurement operation.

13. The method of claim 1, further comprising transmitting information indicating the switching configuration from a first network node to a second network node, wherein the second network node is not the UE and is not a node controlling the switching configuration of the UE.

14. The method of claim 13, wherein the first network node is the UE.

15. The method of claim 13, wherein the second network node is another UE or a non-serving cell.

16. The method of claim 1, wherein determining the duration of time required for the UE to switch between UL operation and DL operation comprises retrieving, from a memory in a network node, previously stored information indicating the duration.

17. The method of claim 1, wherein determining the duration of time required for the UE to switch between UL operation and DL operation comprises measuring the duration.

18. The method of claim 1, wherein the switching configuration is such that the UE avoids switching between UL operation and DL operation while the measurement operation is performed.

19. A method of operating user equipment (UE) in half-duplex frequency division duplex (HD-FDD) mode, wherein UL and DL transmissions occur on different frequencies, the method comprising:
- determining a time interval required by the UE to perform a measurement operation;
- determining a minimum number of subframes required for the measurement operation in the time interval;
- determining a switching configuration for the UE to switch between an UL operation and a DL operation;
- determining a duration of time required for the UE to switch between the UL operation and the DL operation; and
- performing at least one radio measurement over the determined time internal based on the determined minimum number of the subframes and the determined switching configuration, wherein the switching between UL and DL operations is performed within the determined switching duration,
- wherein the switching configuration is such that the UE conforms to at least one pre-defined condition among the following:
  - at most a first number of DL physical signals are lost or do not occur during the time interval;
  - at most a second number of DL common physical channels are lost or do not occur during the time interval;
  - at most a third number of DL dedicated physical channels are lost or do not occur during the time interval;
  - at most a fourth number of UL physical signals are lost or do not occur during the time interval;
  - at most a fifth number of UL common physical channels are lost or do not occur during the time interval; and
  - at most a sixth number of UL dedicated physical channels are lost or do not occur during the time interval.

20. The method of claim 19, further comprising determining the switching configuration based on received scheduling information from a network node.

21. The method of claim 19, wherein the minimum number of subframes comprises at least one of:
- at least a downlink subframe #0 or a downlink subframe #5 per radio frame required for downlink radio measurements;
- at least one downlink subframe per radio frame required for radio link monitoring;
- at least one downlink subframe per radio frame or one uplink subframe per radio frame required for a UE receive-transmit (RX-TX) time difference measurement; and
- at least one positioning reference signal (PRS) subframe per PRS positioning occasion required for reference signal time difference (RSTD) measurement.

22. The method of claim 19, wherein the switching configuration is such that the UE avoids switching between UL operation and DL operation while the measurement operation is performed.

23. The method of claim 19, wherein the switching configuration requires a downlink subframe #0 or a subframe #5 of a Long Term Evolution (LTE) radio frame of an intra-frequency cell to be identified by the UE to be available at the UE during the time interval.

24. The method of claim 19, wherein the switching configuration requires at least one downlink subframe of a Long Term Evolution (LTE) radio frame of a cell corresponding to the measurement operation to be available at the UE for a reference signal received quality (RSRQ) measurement or a reference signal received power (RSRP) measurement.

25. The method of claim 19, further comprising transmitting a result of the performed measurement to a network node.

26. A network node configured to control an uplink/downlink (UL/DL) switching configuration of user equipment (UE) for half-duplex frequency division duplexing (HD-FDD) operation in a radio communication system, comprising:
- a control module configured to determine a duration of time required for the UE to switch between UL operation and DL operation, determine a time interval required by the UE to perform a measurement operation, determine a minimum number of subframes required for the measurement operation in the time interval, and control a switching configuration of the UE based on the determined duration of time, the determined time interval, and the minimum number of subframes.

27. The network node of claim 26, wherein the control module is configured to control the switching configuration to require a downlink subframe #0 or subframe #5 of a Long Term Evolution (LTE) radio frame of an intra-frequency cell to be identified by the UE to be available at the UE during the time interval.

28. The network node of claim 26, wherein the control module is configured to control the switching configuration to require at least one downlink subframe of a Long Term Evolution (LTE) radio frame of a cell corresponding to the measurement operation to be available at the UE for a reference signal received power (RSRP) measurement or a reference signal received quality (RSRQ) measurement.

29. The network node of claim 26, wherein the duration of time comprises a time required for the UE to switch between a UL subframe or time slot of a Long Term Evolution (LTE) radio frame and a DL subframe or time slot of the LTE radio frame.

30. The network node of claim 26, wherein the measurement operation is an intra-frequency measurement performed with respect to a non-serving cell of the UE.

31. User equipment (UE) configured to operate in half-duplex frequency division duplexing (HD-FDD) mode, comprising:
- a communication module configured to communicate with a radio network node using a switching configuration based on a determined duration of time required for the UE to switch between UL operation and DL operation, a determined time interval required by the UE to perform a measurement operation, and a determined a minimum number of subframes required for the measurement operation in the time interval.

32. The UE of claim 31, wherein the switching configuration requires a downlink subframe #0 or subframe #5 of a Long Term Evolution (LTE) radio frame of an intra-frequency cell to be identified by the UE to be available at the UE during the time interval.

33. The UE of claim 31, wherein the switching configuration requires at least one downlink subframe of a Long Term Evolution (LTE) radio frame of a cell corresponding to the measurement operation to be available at the UE for a reference signal received power (RSRP) measurement or a reference signal received quality (RSRQ) measurement.

34. The UE of claim 31, wherein the duration of time comprises a time required for the UE to switch between a UL subframe or time slot of a Long Term Evolution (LTE) radio frame and a DL subframe or time slot of the LTE radio frame.

35. The UE of claim 31, wherein the measurement operation is an intra-frequency measurement performed with respect to a non-serving cell of the UE.

\* \* \* \* \*